(12) United States Patent
Ward et al.

(10) Patent No.: US 7,236,556 B2
(45) Date of Patent: Jun. 26, 2007

(54) SYNCHRONISING CIRCUIT

(75) Inventors: Richard Ward, Abington (GB); Giuseppe Surace, Northampton (GB); Andrew Joy, Northampton (GB)

(73) Assignee: Texas Instruments Incorporated, Dallas, TX (US)

( * ) Notice: Subject to any disclaimer, the term of this patent is extended or adjusted under 35 U.S.C. 154(b) by 755 days.

(21) Appl. No.: 10/624,280

(22) Filed: Jul. 22, 2003

(65) Prior Publication Data
US 2004/0135602 A1 Jul. 15, 2004

(30) Foreign Application Priority Data
Jul. 22, 2002 (EP) ................... 02255105

(51) Int. Cl.
*H04L 25/00* (2006.01)
*H03D 3/24* (2006.01)
(52) U.S. Cl. ...................... 375/371; 375/376
(58) Field of Classification Search ............... 375/371, 375/376, 375, 354, 327, 294; 327/147, 156; 329/325, 360; 342/103
See application file for complete search history.

(56) References Cited
U.S. PATENT DOCUMENTS
4,166,979 A 9/1979 Waggener
4,677,647 A 6/1987 Aoyagi
2002/0196889 A1* 12/2002 Tamura et al. .............. 375/373
2004/0252804 A1* 12/2004 Aoyama ...................... 375/376

FOREIGN PATENT DOCUMENTS
EP 1 385 307 A1 1/2004

OTHER PUBLICATIONS
Brian Watson, "Improvements In or Relating to Clock Regenerators" Patent Specification 1 571 784, Published Jul. 16, 1980.

* cited by examiner

*Primary Examiner*—Khai Tran
(74) *Attorney, Agent, or Firm*—Alan K. Stewart; W. James Brady; Frederick J. Telecky, Jr.

(57) ABSTRACT

In an integrated circuit receiving multiple serial data streams in parallel, a local clock is generated from each data stream and is synchronized with the data stream. Sometimes a data stream may have no transitions making it difficult to keep the clock synchronized with its data. A clock channel is provided, which always has edges. A circuit is provided for each data stream which measures the time elapsed since the data stream had an edge. After a certain period, the phase of the local clock is nudged towards that of the clock channel. Thereafter, the longer there are no edges on the data stream the more frequently nudges towards the phase of the clock channel are made.

39 Claims, 3 Drawing Sheets

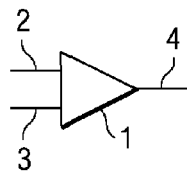
*FIG. 1*
*(PRIOR ART)*
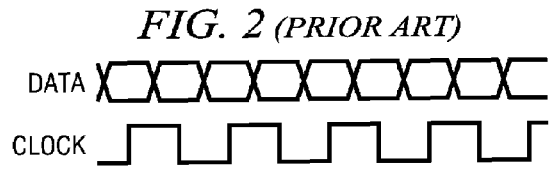
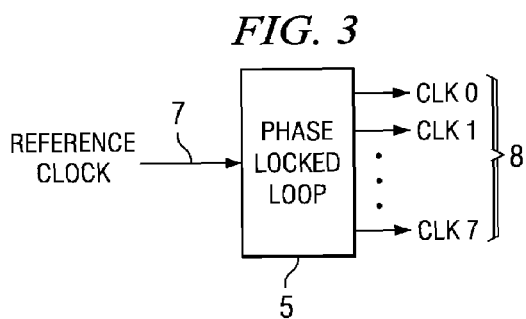
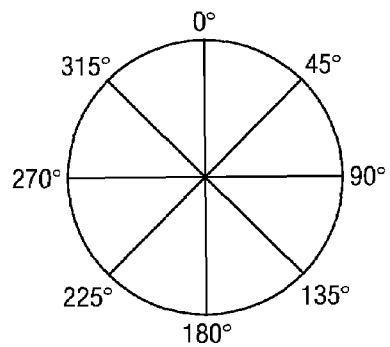
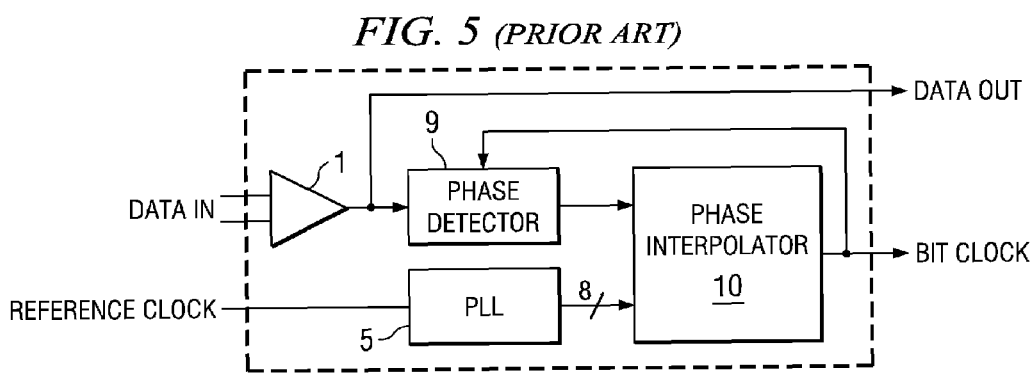
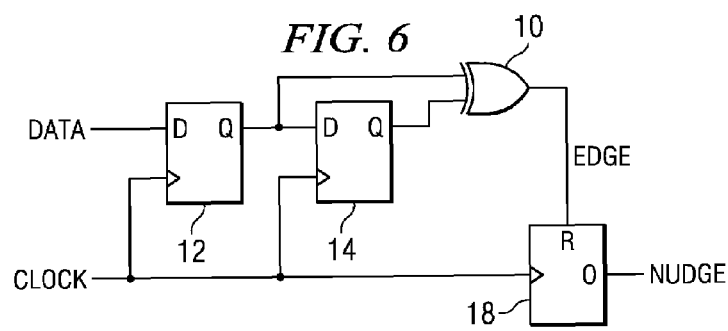

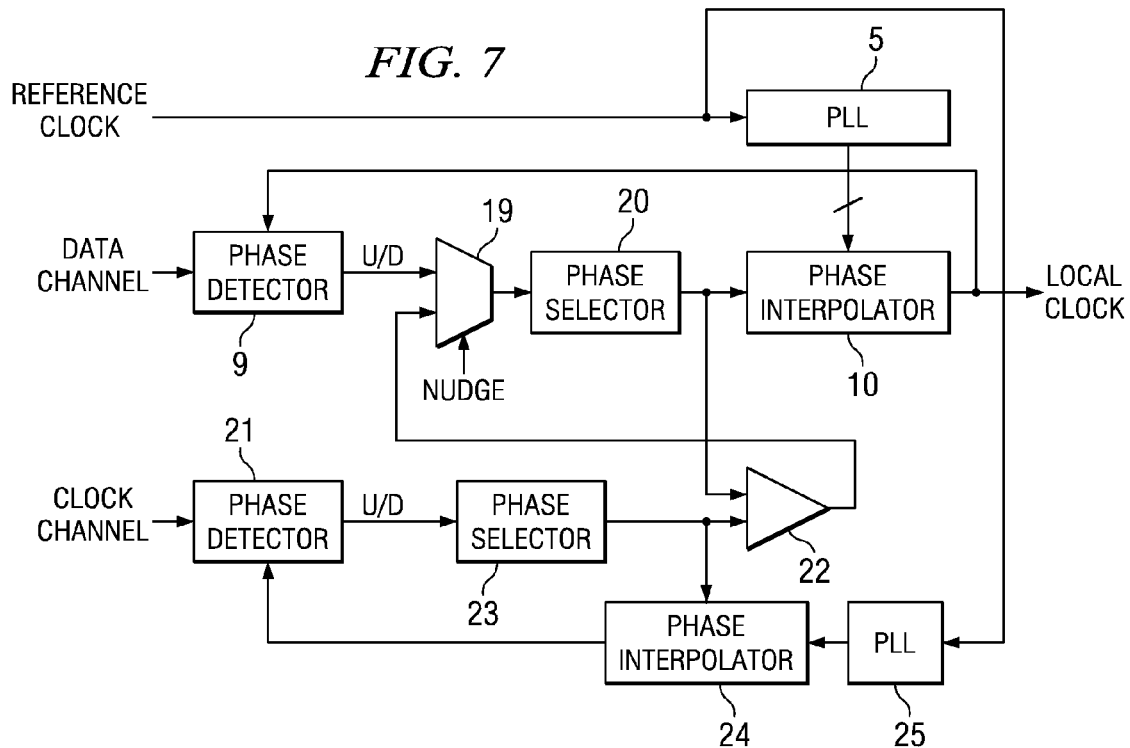
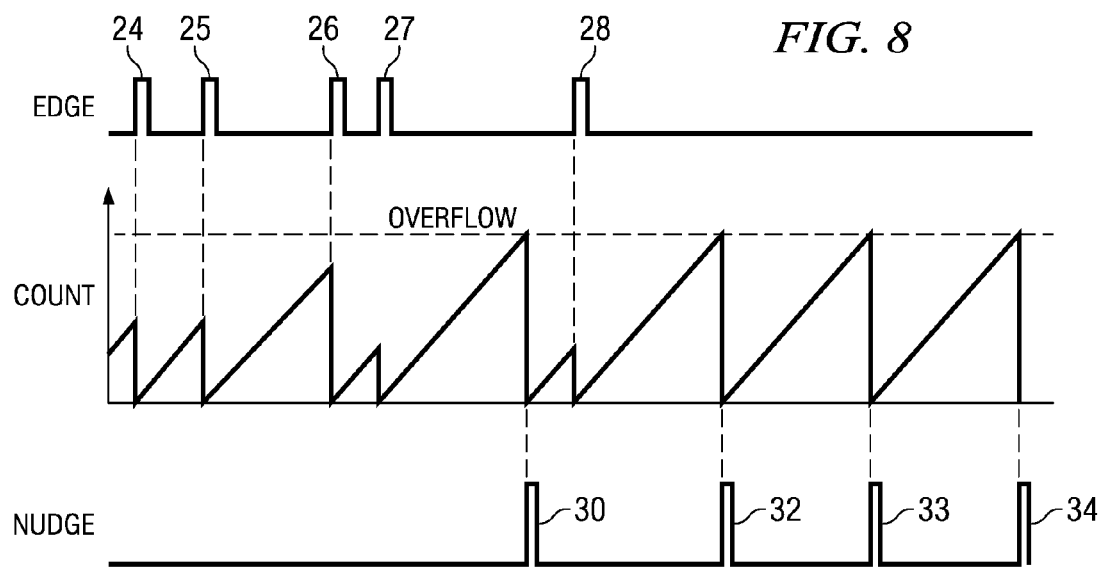

SYNCHRONISING CIRCUIT

FIELD OF THE INVENTION

The present invention relates to the detection of the phase of one or more data streams and more particularly to the generation of an approximation to the phase during a period when there are no data transitions in the data stream.

BACKGROUND OF THE INVENTION

FIG. 1 shows a differential driver 1 that takes a differential input on conductors 2 and 3 and converts that input into a serial data stream on an output conductor 4.

It is known to use the differential driver 1 of FIG. 1 as an input stage to a digital system. It is also known to generate a clock signal for the digital system from the data stream on the output 4 of the differential driver 1.

FIG. 2 shows a single data stream and an associated clock signal. The clock signal shown in FIG. 2 samples the data on both the rising and falling clock edges and the clock transitions are closely aligned with the mid-point of data transitions. Such alignment is preferable as the data is given the maximum time both before and after the clock transition in which to be stable. This gives the best chance of the set-up and hold times of subsequent circuits not being violated.

One method of achieving such clock alignment uses the circuit of FIG. 3. A phase locked loop (PLL) 5 is shown with an input 7 receiving a reference clock signal at the required frequency. The PLL generates a number of clock outputs 8 (8 in the example of FIG. 3) each at a difference phase (spaced apart by 45 degrees in the example of FIG. 3). The clock signal can be placed close to the mid-point of the data transitions by selecting the most appropriate clock signal from the output 8 of the PLL 7.

Another method of determining the optimum clock signal is demonstrated with reference to FIGS. 4 and 5. FIG. 4 shows a phase wheel with 8 phase signals indicated, representing the eight phases of the PLL output 8. Those phase signals are plotted at 0, 45, 90, 135, 180, 225, 270 and 315 degrees respectively. The phase of a data stream relative to a reference signal (for example, relative to the reference clock input) can be plotted on the phase wheel. Once the phase of the data stream is "plotted" on the wheel, the outputs 8 of the PLL that are located either side of the data stream can be identified.

FIG. 5 is a block diagram of a circuit for generating the appropriate clock signal. The output of the differential driver 1 is passed to a phase detector 9 that determines the phase of the data (for example, with reference to the generated clock signal). The output of the phase detector 9 is passed to a phase interpolator 10 along with the eight clock signals from the PLL 7. A clock signal is generated by identifying the two phase signals from the PLL 5 between which the phase of the data stream falls and using the phase interpolator to generate a clock signal with a phase between those two clock signals. In the example of FIG. 5, the output of phase interpolator 10 is fed back to an input of the phase detector 9. The phase detector 9 is thus used to determine the difference in the phase at the output of the phase interpolator and the phase of the data stream in the data channel. A typical phase interpolator may generate the most appropriate clock phase between those phase inputs from 16 possibilities. Thus the phase wheel can be divided into 16×8 (i.e. 128) clock phases.

The purpose of generating a local clock signal for each data channel is to ensure that each clock signal is optimised for that channel. This is particularly significant when the relative delays in the channels are not constant. Such a system is used, for example, when it is not acceptable to simply select a single clock and to use that for all data channels.

Thus in a system where each data channel is likely to have a different phase, the generation of a local clock for each data channel is advantageous. This requires the phase of the data for each channel to be identified. The more frequently the data signal of any given channel changes (i.e. has edges), the more accurately the relative phase of the data in that channel can be determined. The inventors have noted, however, that if the data signal is static (i.e. there are no data transitions for a significant period of time) then it is not possible to determine the phase of that data channel. One option for handling such a situation is to retain the previous phase value until another data transition occurs. However, this suffers from the disadvantage that actual phase of the data in the channel can become significantly different to the phase value of the local clock.

SUMMARY OF THE INVENTION

The present invention uses, in one embodiment, a clock signal, available in some applications, on one of the data channels (the "clock channel"). That channel therefore has periodic data transitions. The phase of the clock channel can be readily determined and plotted on a phase wheel such as that of FIG. 4.

Although each data channel generally contains data with a different phase, the inventors have realised that in many applications, the phases of the channels will be similar, undergoing common jitter, but subject to small, possibly random, variations with respect to one another. Thus, whilst the phase of a data stream is most accurately determined from the data in that data stream, a reasonable estimate of that phase can be determined by determining the phase of another channel. Since the clock channel has a periodically changing signal, the phase of which can be accurately determined, the clock channel can be used as the best alternative guess of the phase of a data channel in which the data is static. Another data channel would provide a suitable alternative if it had edges in its data signal frequently enough or, as a further alternative, a clock signal derived from an average phase of the channels could be used.

The longer the period of time since the previous data transition on a given data channel, the less accurate the phase of the data of that channel will be known, since there will not have been an opportunity to adjust the phase in the intervening time. Eventually, the phase of that channel will be so uncertain, that it would be more accurate, the inventors propose, to use the phase of another channel, preferably the clock channel, as that is likely to be closer to the phase of the given data channel than the phase of the given data channel on its previous data transition.

It would be possible to simply jump from the last known phase of the data channel to the current phase of the clock channel at the time at which the phase of the clock channel is judged probably to be more accurate than the previous known phase of the data channel.

An alternative solution is to wait until a suitable time has expired without any data transitions of the data channel and to then move (or "nudge") the phase of the data channel by a small amount around the phase wheel in the direction of the phase of the clock channel. This approach has the advantage of not significantly changing the estimated phase of the data channel by a large amount initially; rather the phase is moved in small increments reflecting the gradual transition from confidence in the phase of the channel to confidence in the phase of, for example, the clock channel. The jitter between channels has random and system components which result from board trace difference among the channels. The ideal transition time is zero providing phase re-alignment.

The present invention provides a circuit comprising:

a first data channel and at least one other channel;

clock synchronising means for generating a local clock synchronised with the first data channel;

timing means associated with the first data channel for measuring the time since the last data transition on that channel and operable to provide a timing signal indicative of that time;

phase detect means, associated with the first data channel, for detecting a representative phase of a selected set of one or more channels, that set comprising, at least, said at least one other channel;

phase adjustment means for adjusting the phase of the local clock in response to the timing signal towards said phase of said set.

In one arrangement, said set consists of a single channel, being the or one of said at least one other channel, and said representative phase is the phase of that single channel.

In an alternative arrangement, said set comprises a plurality of channels.

Preferably, said phase representative of said set is an average of the phases of the members of said set.

Preferably, said set comprises said at least one other channel and said first data channel itself.

Preferably, the timing means is arranged to issue a first interval signal when a first time period has elapsed since a last data transition occurred on the first data channel.

In one arrangement, in the continued absence of a data transition on the first data channel, the timing means is arranged to issue interval signals at constant intervals.

In an alternative arrangement, in the continued absence of a data transition on the first data channel, the timing means is arranged to issue interval signals at intervals that get progressively shorter.

Preferably, when the intervals get progressively shorter, the intervals are subject to a minimum time interval.

Preferably, when interval signals are issued, the phase adjustment means is responsive to said interval signals to adjust the phase of the local clock towards the phase of said selected set.

In one arrangement, the phase adjustment means is responsive to successive interval signals to adjust the phase of the local clock by a constant amount.

In an alternative arrangement, the phase adjustment means is responsive to successive interval signals to adjust the phase of the local clock by increasing amounts.

In a further alternative arrangement, the phase adjustment means is responsive to successive interval signals to adjust the phase of the local clock by reducing amounts.

In one more alternative arrangement, the phase adjustment means is responsive to successive interval signals to adjust the phase of the local clock by initially increasing then by reducing amounts.

Preferably, the timing means comprises a counter.

Preferably, the timing means is so arranged that the counter counts through a number of counts before issuing a timing signal.

Preferably, the timing means is so arranged that the counter begins a new count each time it issues a timing signal.

Preferably, the timing circuit is so arranged that each time a timing signal is issued, since the last data transition, the counter counts a respective number of counts in response to being loaded with a respective value stored in the circuit.

Preferably, when the counter begins a new count each time it issues a timing signal, the timing circuit is so arranged that the successive counts are smaller by a constant ratio to the previous one.

Preferably, the timing circuit is so arranged that after a certain number of successive counts the count becomes constant.

Preferably, the circuit includes an edge detect circuit for detecting a data transition on the first data channel and resetting in response the sequence of counts.

Preferably, the circuit includes an edge detect circuit for detecting a data transition on the first data channel and resetting in response the timing means.

Preferably, the circuit includes an edge detect circuit for detecting a data transition on the first data channel and resetting in response the phase of the local clock to that of the first data channel.

Preferably, the circuit so operates that the amount of the phase adjustments depends on the magnitude of the difference between the phase of the first data channel and said representative phase of said set.

The invention also provides a method of providing a local clock signal associated with a first data channel, the method comprising the steps of:

generating a local clock signal synchronised with the first data channel;

measuring the time since the last data transition on the first data channel and providing a timing signal indicative of that time;

detecting a phase representative of a selected set of one or more channels, that set comprising at least one channel other than the first data channel;

adjusting the phase of the local clock, in response to the timing signal, towards the phase of said set.

In one method, said set consists of a single channel, that single channel being one of the channels other than the first data channel, and said representative phase is the phase of that single channel.

In an alternative method, said set comprises a plurality of channels.

In a method wherein said set comprises a plurality of channels, said phase representative of said set is an average of the phases of the members of said set.

Preferably, in a method wherein said set comprises a plurality of channels, said set includes said first data channel.

Preferably, providing said timing signal comprises issuing a first interval signal when a first time period has elapsed since a last data transition occurred on the first data channel.

In one method, providing said timing signal comprises issuing, in the continued absence of a data transition on the first data channel, interval signals at constant intervals.

In an alternative method, providing said timing signal comprises issuing, in the continued absence of a data transition on the first data channel, interval signals at intervals that get progressively shorter.

Preferably, the interval between successive interval signals gets smaller by a constant ratio and, preferably, the intervals are subject to a minimum time interval.

Preferably, the step of adjusting the phase of the local clock occurs in response to said interval signals.

In one method, the adjustment of the phase of the local clock occurs in constant amounts.

In an alternative method, the adjustment of the phase of the local clock occurs in increasing amounts.

In another alternative method, the adjustment of the phase of the local clock occurs in reducing amounts.

In a further alternative method, the adjustment of the phase of the local clock occurs initially in increasing amounts and then in reducing amounts.

Preferably, the method further comprises the step of resetting the phase of the local clock to the phase of the first data channel in response to a data transition on that channel.

Preferably, the amount of the adjustments of the phase of the local clock depends on the magnitude of the difference between the phase of the first data channel and said representative phase of said set.

BRIEF DESCRIPTION OF THE DRAWINGS

An embodiment of the invention will now be described, by way of example only, with reference to the accompanying drawings, of which:

FIG. 1 shows a known differential driver that takes a differential signal and coverts it into a single-ended serial data stream;

FIG. 2 shows a data stream generated by the circuit of FIG. 1 and an associated clock signal;

FIG. 3 shows a phase-locked loop generating multiple phase clock signals from a single reference clock source;

FIG. 4 shows a phase wheel;

FIG. 5 is a circuit demonstrating a method of obtaining an optimum clock signal;

FIG. 6 is a circuit diagram of one implementation of a nudge function in accordance with a first embodiment of the present invention;

FIG. 7 is a diagram of a circuit to generate a local clock signal in accordance with the present invention;

FIG. 8 is a timing diagram illustrating the functionality of the circuit of FIG. 6;

DETAILED DESCRIPTION OF PREFERRED EMBODIMENTS

Figure 9:
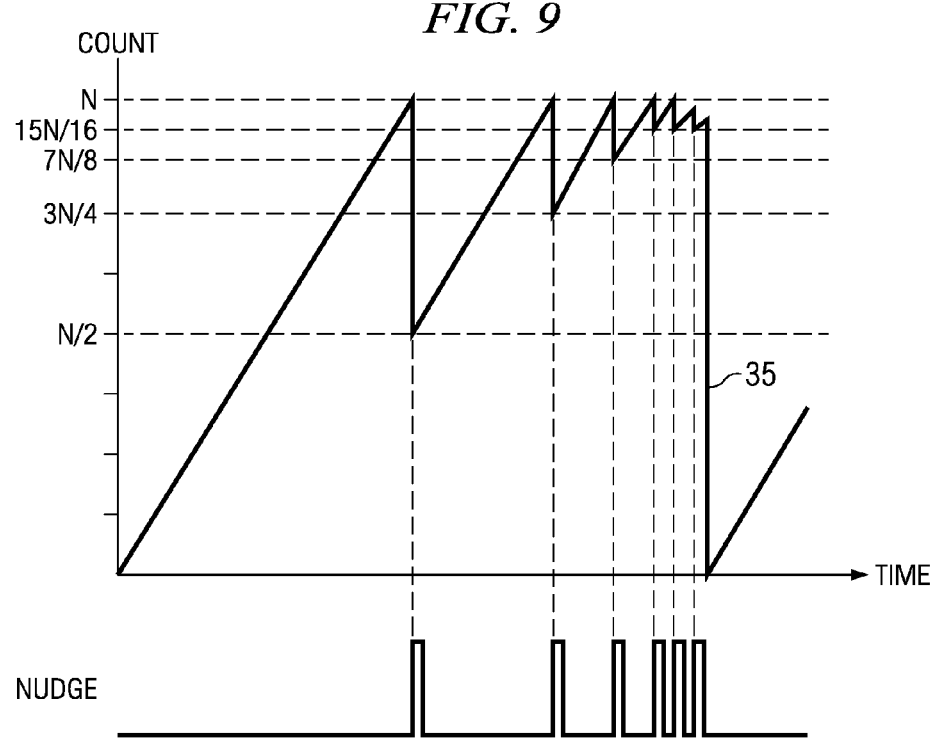
FIG. 9 is a timing diagram of a second embodiment of the present invention.

FIG. 6 shows a circuit that can be used to implement the nudge function described above. The circuit includes flip-flops 12 and 14, exclusive-OR (XOR) gate 16 and counter 18. Flip-flops 12 and 14 and XOR gate 16 are used as an edge detector. The data signal of the relevant data channel is coupled to the D-input of flip-flop 12 and the Q-output of flip-flop 12 is coupled to the D-input of flip-flop 14. The Q-outputs of flip-flops 12 and 14 are respectively coupled to first and second inputs of XOR gate 16, the clock inputs of flip-flops 12 and 14 and counter 18 are coupled to a CLK input and the output of the XOR gate provides an EDGE signal, which is coupled to the reset input R of the counter. The counter is provided with an overflow output O so that each time the counter overflows, a nudge signal is provided.

The CLK input may be a bit-clock, both positive and negative edges being used or, alternatively, a double-rate clock, only positive edges being used.

The nudge signal produced by the circuit of FIG. 6 is used to adjust the phase of the data channel using the circuit of FIG. 7. The circuit of FIG. 7 uses the PLL 5, phase detector 9 and phase interpolator 10 of FIG. 5. In addition, the circuit of FIG. 7 includes multiplexer 19, phase selectors 20 and 23, phase detector 21, comparator 22, phase interpolator 24 and PLL 25.

Phase detector 9 compares the phase output of the phase interpolator 10 and the phase of the data channel and outputs and up/down signal U/D indicative of whether the phase of the data channel is advanced or retarded with respect to the phase output of the phase interpolator. The U/D signal is passed to multiplexer 19, the select input of which is coupled to the NUDGE output of FIG. 6. In the absence of a NUDGE signal (i.e. during the normal mode when data transitions are occurring on the data channel), the U/D signal is passed to phase selector 20. Phase selector 20 advances or retards the phase of the local clock signal and passes that phase information to phase interpolator 10.

Phase interpolator 10 generates the local clock signal in the same manner as described in relation to FIG. 5.

The clock channel also has a phase detector 21, a phase selector 23, a phase interpolator 24 and a PLL 25. These also function in the same manner as described in relation to FIG. 5 to provide a clock signal in phase with the clock channel (with respect to the same reference clock as used for the data channel).

The output of phase selector 20 for the data channel is also passed to a first input of comparator 22. The second input of comparator 22 is coupled to the output of phase selector 23 for the clock channel. Thus comparator 22 detects whether the phase of the local clock is advanced or retarded with respect to the phase of the clock channel. The output of comparator 22 is provided as the second input to multiplexer 19.

When a nudge signal is provided at the control input of multiplexer 19, the signal passed to phase selector 20 is the output of comparator 22. Thus a signal indicating whether the local clock is advanced or retarded with respect to the phase of the clock channel is passed to the phase selector. The phase selector then adjusts the phase of the local clock by a small interval in the direction of the phase of the clock channel, as required.

The operation of the circuit of FIG. 6 is shown in the timing diagram of FIG. 8. The output of XOR gate 16 is low when the Q-outputs of flip-flops 12 and 14 are at the same value and high when they are at different values. Thus on each data transition, XOR gate 18 produces a pulse as the effect of that data transition passes through the flip-flop circuits. A number of such pulses are shown at 24, 25, 26, 27 and 28 in FIG. 7.

With each pulse from XOR gate 16, counter 18 is reset to zero. The counter then ramps again towards an overflow amount. When the gap between the reset pulses is sufficiently large to allow the counter to reach the overflow value before a reset pulse is received, a nudge pulse is obtained, for example at points 30, 32, 33 and 34. When a nudge pulse is provided the counter is reset to zero.

The change in phase produced by each nudge pulse is constant and the intervals between the nudge pulses 32, 33 and 34 are the same. The phase is simply nudged towards the clock in fixed intervals and when it reaches the phase of the clock channel, the phase simply oscillates either side of the clock phase. A constant phase change for each nudge pulse is the preferred arrangement.

In the embodiment of the invention shown in FIGS. 6 and 8, the counter is reset to zero each time a nudge signal is provided. The counter then starts counting again so that, if the data is static for an extended period of time, a succession of nudge signals will be obtained (see, for example, nudge signals 33 and 34), thereby moving the local clock phase towards the phase of the clock channel. Each nudge signal is spaced from the previous nudge signal by a constant period of time: that time period being determined by the clock frequency and the overflow value of the counter.

It is advantageous to increase the rate at which the phase of the data channel is nudged towards the phase of the clock channel as the time since the last data transition increases. Thus it is advantageous to adapt the reset function of the counter to allow the time between successive nudge signals to get progressively shorter, as shown in the timing diagram of FIG. 9.

In the example of FIG. 9, when a data transition occurs, the counter is reset to zero, as before as can be seen at point 35. However, on reaching the overflow amount for a first time, the counter is reset to N/2 (N being the overflow value). On reaching the overflow amount for a second time, the counter is reset to 3N/4, for the third time to 7N/8 and for the fourth time to 15N/16. Thus a nudge signal is generated more and more often as the time since the last data transition increases.

In the example of FIG. 9, once the counter is reset to 15N/16, each successive nudge signal also causes a reset to 15N/16.

Figure 10:
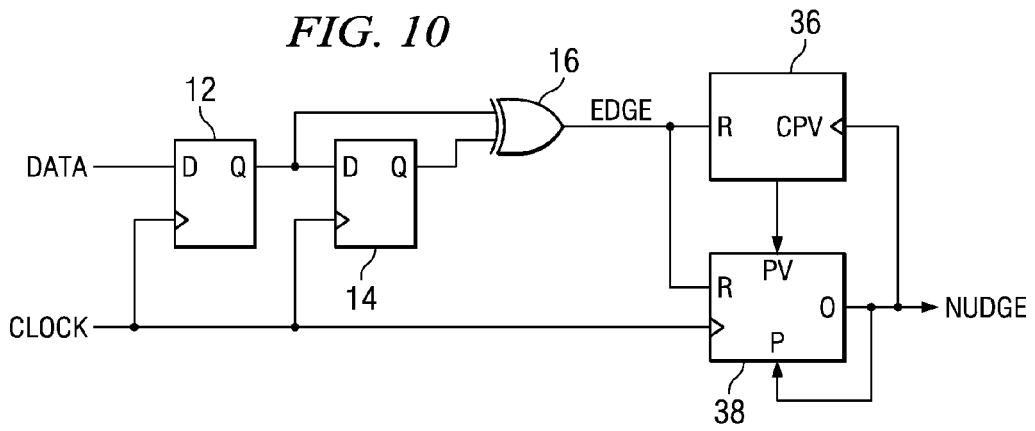
FIG. 10 is a circuit diagram implementing the functionality shown in the timing diagram of FIG. 9.

The functionality of the timing diagram of FIG. 9 can be achieved using the circuit of FIG. 10. The circuit of FIG. 10 is a modified version of the circuit of FIG. 6 and like circuit elements are labelled with like numerals. The circuit of FIG. 10 differs from that of FIG. 6 by the addition of a preset circuit 36 and the provision of a modified counter 38 in place of counter 18. Preset circuit 34 has a reset input R coupled to the EDGE signal, a change preset value input CPV coupled to an overflow output O of counter 38 and an output providing a preset value PV input to counter 38.

Counter 38 differs from that of counter 18 in that, when an overflow condition is detected so that a nudge signal is output from the counter, that nudge signal is provided as a preset input P to the counter. On receiving such a preset input, the counter is preset to the value on the preset value PV input.

When a data transition is detected by flip-flops 12 and 14 and XOR gate 16, an EDGE signal is applied to both reset circuit 36 and counter 38. That edge signal resets the counter 38 to zero and sets the preset value in preset circuit 36 to N/2. If the overflow condition is reached, the nudge signal forces the preset input P high and the counter value is set to N/2. In addition, the nudge signal is provided as a change present value input CPV to preset circuit 36. In response to this, preset circuit 36 changes the preset value to 3N/4. On the next nudge signal, the preset value is set to 7N/8 and a further nudge signal sets the preset value to 15N/16. Further nudge signals at this stage do not affect the preset value, which remains at 15N/16. An EDGE signal at any time resets the counter to zero and the preset value to N/2.

In alternative embodiments of the invention, the change in phase caused by a nudge signal may not be constant. For example, the nudge size could be dependent on the length of time since the last data transition, on the difference in the current phase value of the data stream and the phase value of the clock channel or on a combination of the two.

The nudge size could be increased with time in order to accelerate the move towards the phase value of the clock rate. This could be used instead of, or in combination with, the increase in frequency of the nudge signals. Alternatively, it may be advantageous to reduce the nudge size with time since, as the phase value gets closer to the phase value of the clock channel, it will not be necessary to change the phase value by much; such a reduction in nudge size would reduce the amount of oscillation of the phase value about the phase value of the clock channel after very long periods without any data transitions. Yet a further embodiment may provide a nudge size that initially increases to accelerate the move towards the phase value of the clock rate and then decreases to reduce the effect of oscillation.

Instead of varying the preset value to which the counter is preset after a nudge signal is issued, a similar functionality could be achieved by resetting the counter to zero and varying the value at which the overflow output of the counter is set (i.e. by varying that value at which the nudge signal is issued). The nudge signal could be issued, for example, at a value N for the first time and then at N/2, N/4, N/8 and N/16 for the second, third, fourth and fifth time, respectively. The nudge signal may then be issued at N/16 thereafter.

In the above examples the phase of the bit clock of the data channel has been nudged towards the phase of a clock channel. It is not necessary that that channel is a clock channel per se. Some other channel that can be relied on in that it has a phase that is close enough to the particular data channel and has a sufficient frequency of edges could be used instead. In a system having several data channels, the channel to be used as a clock channel could be dynamically selected on the basis that it has had edges recently. Further the phase towards which the bit clock of the data channel is nudged could be a phase representative of a plurality channels, for example an average of the phase values provided by respective phase selectors for the plurality of channels. The average need not exclude the channel being nudged which is convenient if several channels are being nudged since the same average can be used for all.

The invention claimed is:

1. A circuit comprising:
a first data channel and at least one other channel;
clock synchronising means for generating a local clock synchronised with the first data channel;
timing means associated with the first data channel for measuring the time since the last data transition on that channel and operable to provide a timing signal indicative of that time;
phase detect means, associated with the first data channel, for detecting a representative phase of a selected set of one or more channels, that set comprising, at least, said at least one other channel;
phase adjustment means for adjusting the phase of the local clock in response to the timing signal toward said phase of said set;
wherein the amount of the phase adjustments depends on the magnitude of the difference between the phase of the first data channel and said representative phase of said set.

2. A circuit as claimed in claim 1, wherein said set consists of a single channel, being one of said at least one other channel, and said representative phase is the phase of that single channel.

3. A circuit as claimed in claim 1, wherein said set comprises a plurality of channels.

4. A circuit as claimed in claim 3, wherein said phase representative of said set is an average of the phases of the members of said set.

5. A circuit as claimed in claim 3, wherein said set comprises said at least one other channel and said first data channel itself.

6. A circuit as claimed in claim 1, wherein the timing means is arranged to issue a first interval signal when a first time period has elapsed since a last data transition occurred on the first data channel.

7. A circuit as claimed in claim 1, wherein, in the continued absence of a data transition on the first data channel, the timing means is arranged to issue interval signals at constant intervals.

8. A circuit as claimed in claim 1, wherein in the continued absence of a data transition on the first data channel, the timing means is arranged to issue interval signals at intervals that get progressively shorter.

9. A circuit as claimed in claim 8, wherein the intervals are subject to a minimum time interval.

10. A circuit as claimed in claim 6, wherein the phase adjustment means is responsive to said first interval signals to adjust the phase of the local clock towards the phase of said selected set.

11. A circuit as claimed in claim 10, wherein the phase adjustment means is responsive to successive interval signals to adjust the phase of the local clock by a constant amount.

12. A circuit as claimed in claim 10, wherein the phase adjustment means is responsive to successive interval signals to adjust the phase of the local clock by increasing amounts.

13. A circuit as claimed in claim 10, wherein the phase adjustment means is responsive to successive interval signals to adjust the phase of the local clock by reducing amounts.

14. A circuit as claimed in claim 10, wherein the phase adjustment means is responsive to successive interval signals to adjust the phase of the local clock by initially increasing then by reducing amounts.

15. A circuit as claimed in claim 1, wherein the timing means comprises a counter.

16. A circuit as claimed in claim 15, wherein the timing means is so arranged that the counter counts through a number of counts before issuing a timing signal.

17. A circuit as claimed in claim 16, wherein the timing means is so arranged that the counter begins a new count each time it issues a timing signal.

18. A circuit as claimed in claim 17, wherein the timing circuit is so arranged that each time a timing signal is issued, since the last data transition, the counter counts a respective number of counts in response to being loaded with a respective value stored in the circuit.

19. A circuit as claimed in claim 17, wherein the timing circuit is so arranged that the successive counts are smaller by a constant ratio to the previous one.

20. A circuit as claimed in claim 19, wherein the timing circuit is so arranged that after a certain number of successive counts the count becomes constant.

21. A circuit as claimed in claim 15 including an edge detect circuit for detecting a data transition on the first data channel and resetting in response the sequence of counts.

22. A circuit as claimed in claim 1 including an edge detect circuit for detecting a data transition on the first data channel and resetting in response the timing means.

23. A circuit as claimed in claim 1 including an edge detect circuit for detecting a data transition on the first data channel and resetting in response the phase of the local clock to that of the first data channel.

24. A method of providing a local clock signal associated with a first data channel, the method comprising the steps of:
generating a local clock signal synchronised with the first data channel;
measuring the time since the last data transition on the first data channel and providing a timing signal indicative of that time;
detecting a phase representative of a selected set of one or more channels, that set comprising at least one channel other than the first data channel;
adjusting the phase of the local clock, in response to the timing signal, towards the phase of said set;
wherein the amount of the adjustments of the phase of the local clock depends on the magnitude of the difference between the phase of the first data channel and said representative phase of said set.

25. A method as claimed in claim 24, wherein said set consists of a single channel, that single channel being one of the channels other than the first data channel, and said representative phase is the phase of that single channel.

26. A method as claimed in claim 24, wherein said set comprises a plurality of channels.

27. A method as claimed in claim 26, wherein said phase representative of said set is an average of the phases of the members of said set.

28. A method as claimed in claim 26, wherein said set includes said first data channel.

29. A method as claimed in claim 24, wherein providing said timing signal comprises issuing a first interval signal when a first time period has elapsed since a last data transition occurred on the first data channel.

30. A method as claimed in claim 24, wherein providing said timing signal comprises issuing, in the continued absence of a data transition on the first data channel, interval signals at constant intervals.

31. A method as claimed in claim 24, wherein providing said timing signal comprises issuing, in the continued absence of a data transition on the first data channel, interval signals at intervals that get progressively shorter.

32. A method as claimed in claim 31 wherein the interval between successive interval signals gets smaller by a constant ratio.

33. A method as claimed in claim 31, wherein the intervals are subject to a minimum time interval.

34. A method as claimed in claim 29, wherein the step of adjusting the phase of the local clock occurs in response to said interval signals.

35. A method as claimed in claim 34, wherein the adjustment of the phase of the local clock occurs in constant amounts.

36. A method as claimed in claim 34, wherein the adjustment of the phase of the local clock occurs in increasing amounts.

37. A method as claimed in claim 34, wherein the adjustment of the phase of the local clock occurs in reducing amounts.

38. A method as claimed in claim 34, wherein the adjustment of the phase of the local clock occurs initially in increasing amounts and then in reducing amounts.

39. A method as claimed in claim 24 and further comprising the step of resetting the phase of the local clock to the phase of the first data channel in response to a data transition on that channel.

* * * * *